July 10, 1951  L. PEASE  2,560,126
REVERSIBLE VARIABLE-SPEED AND VARIABLE-TORQUE
TRANSMISSION MECHANISM
Filed Dec. 17, 1946  5 Sheets-Sheet 3
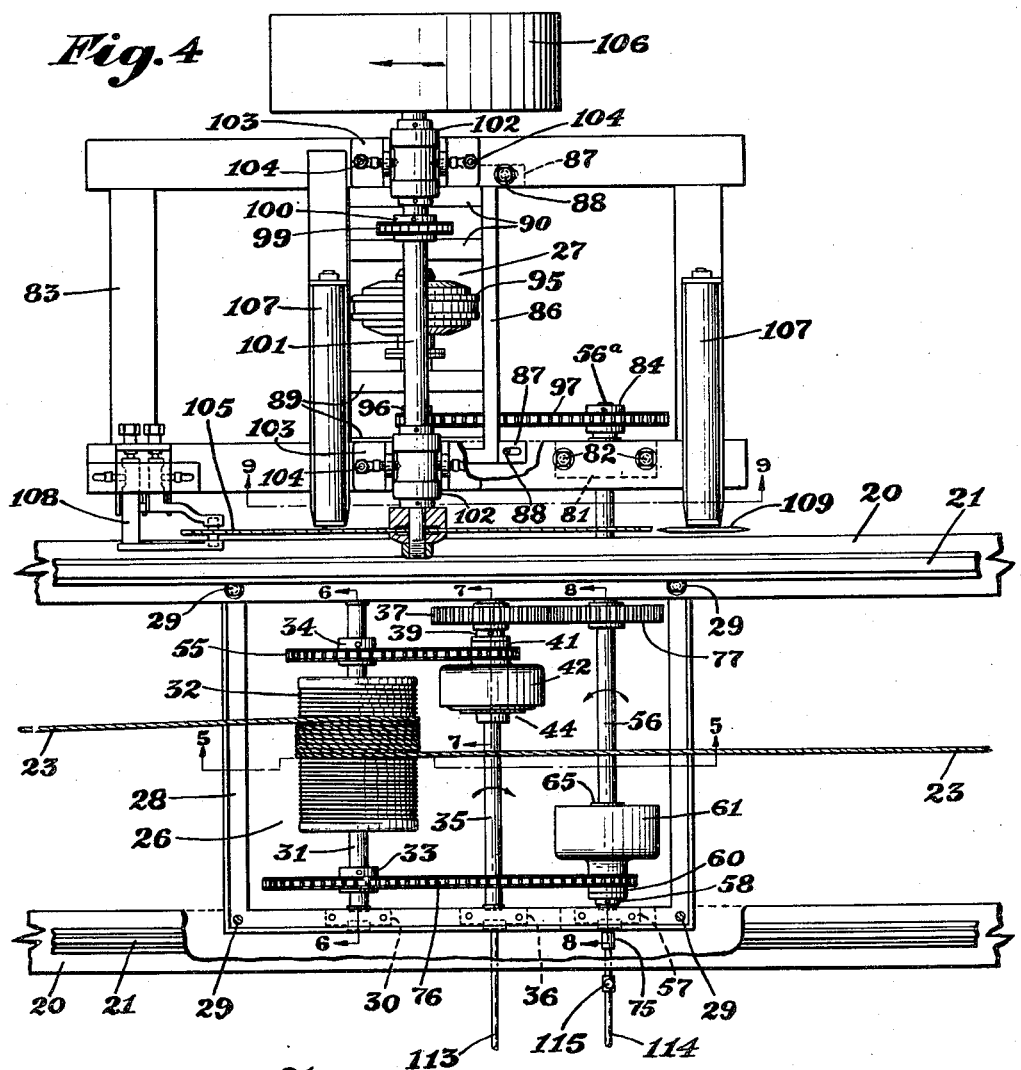
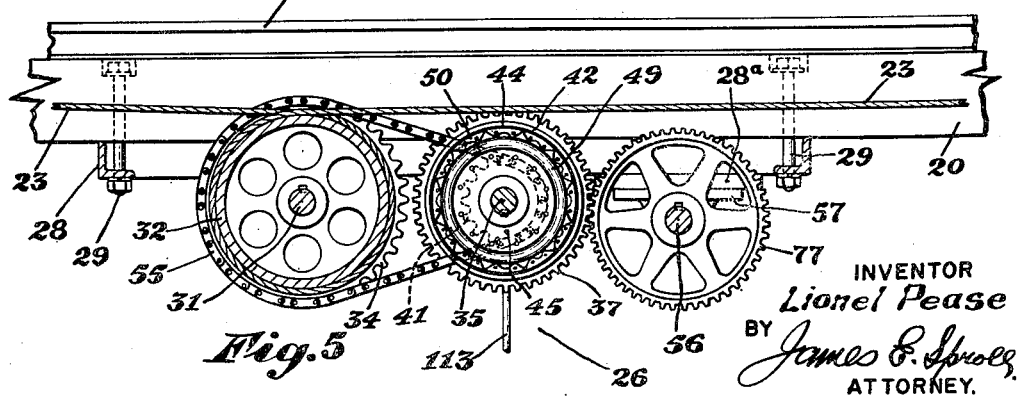
INVENTOR
Lionel Pease
BY James E. Sproll
ATTORNEY.

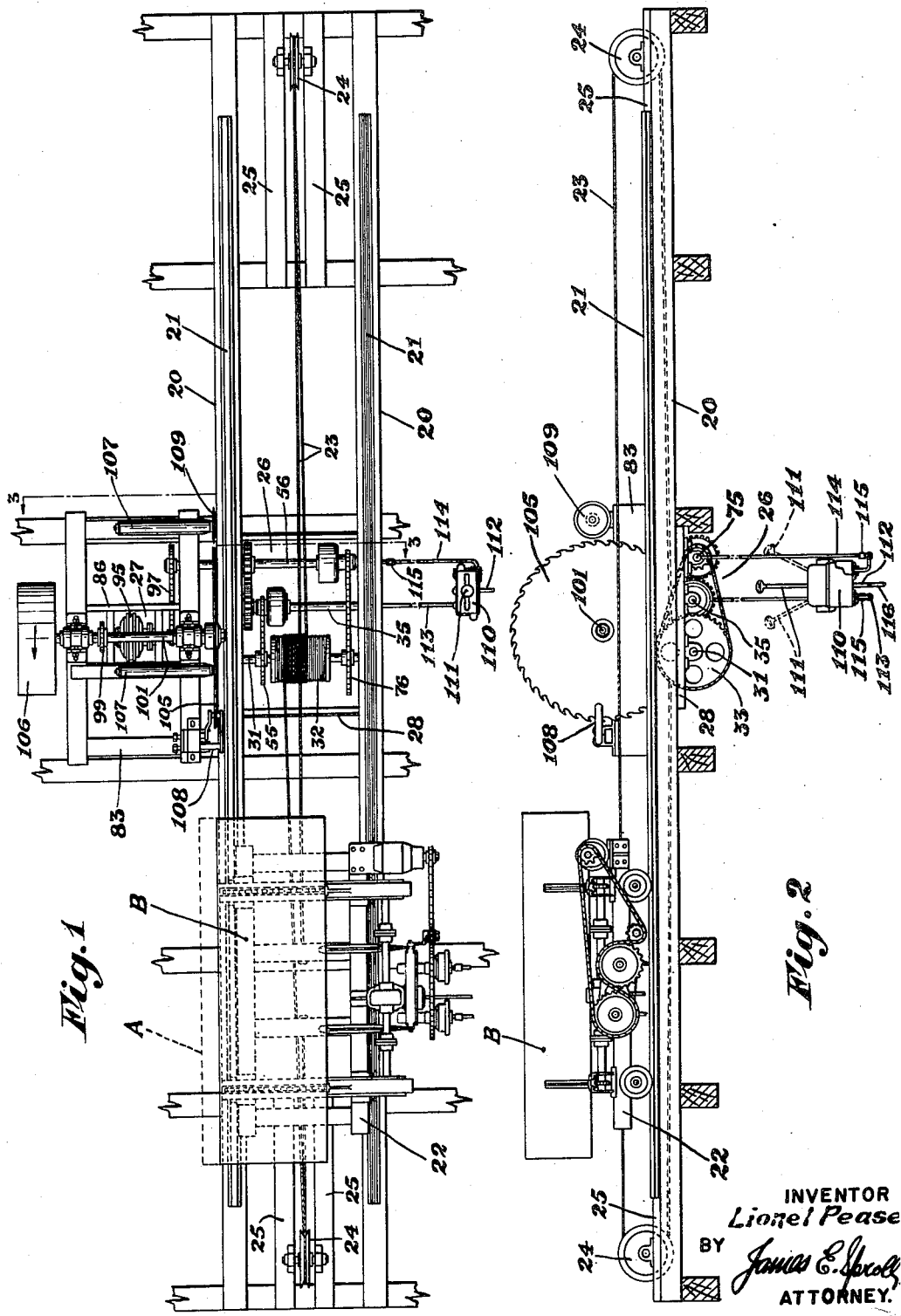

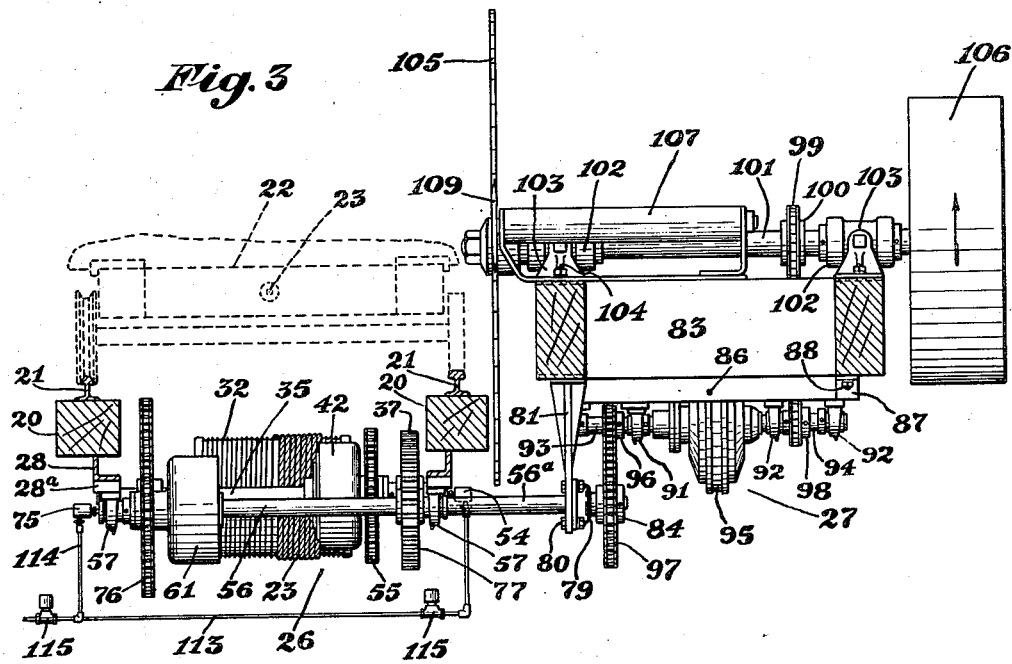
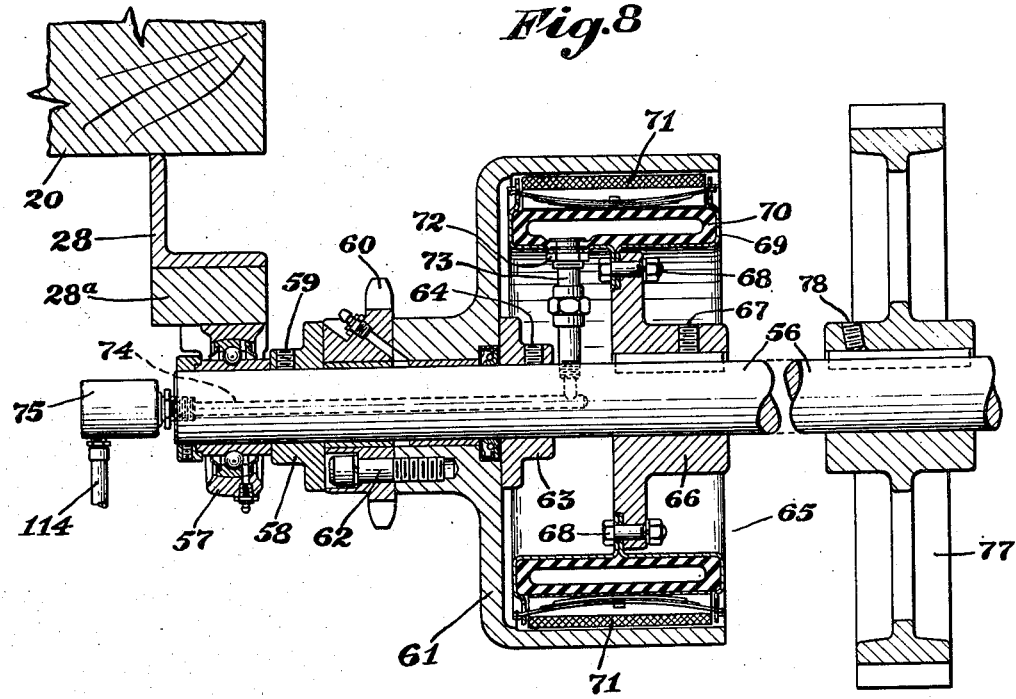

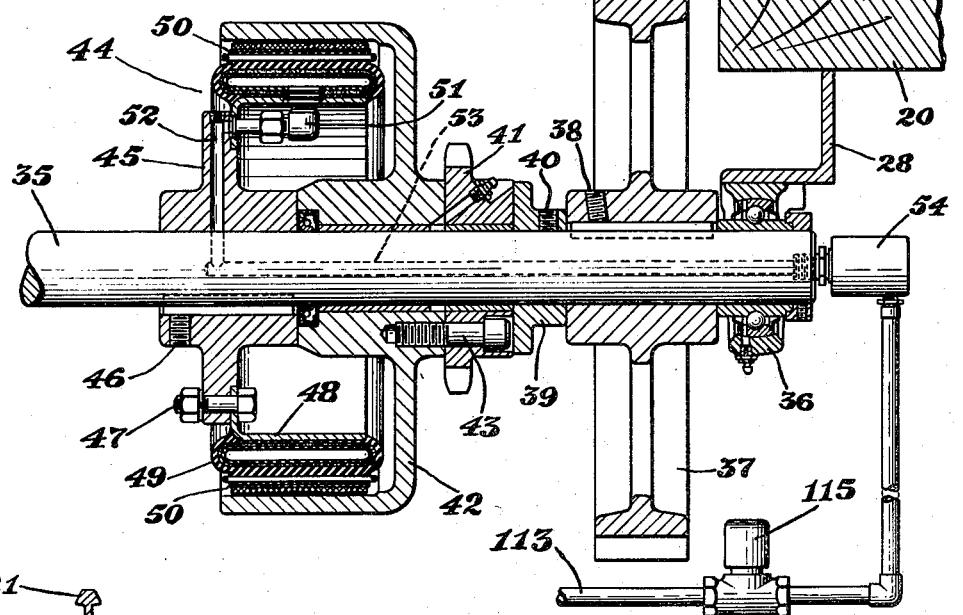
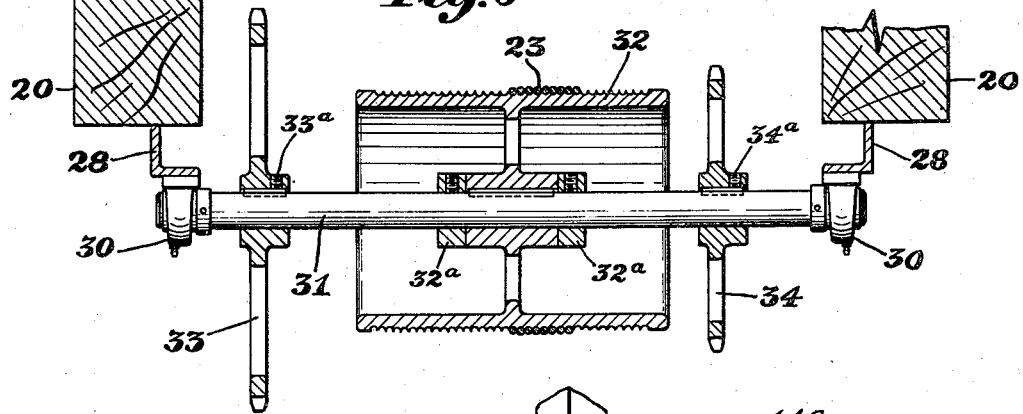
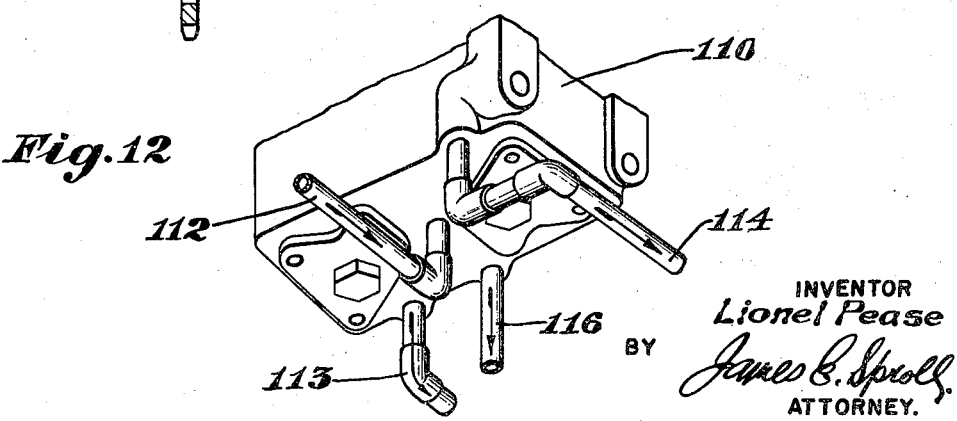

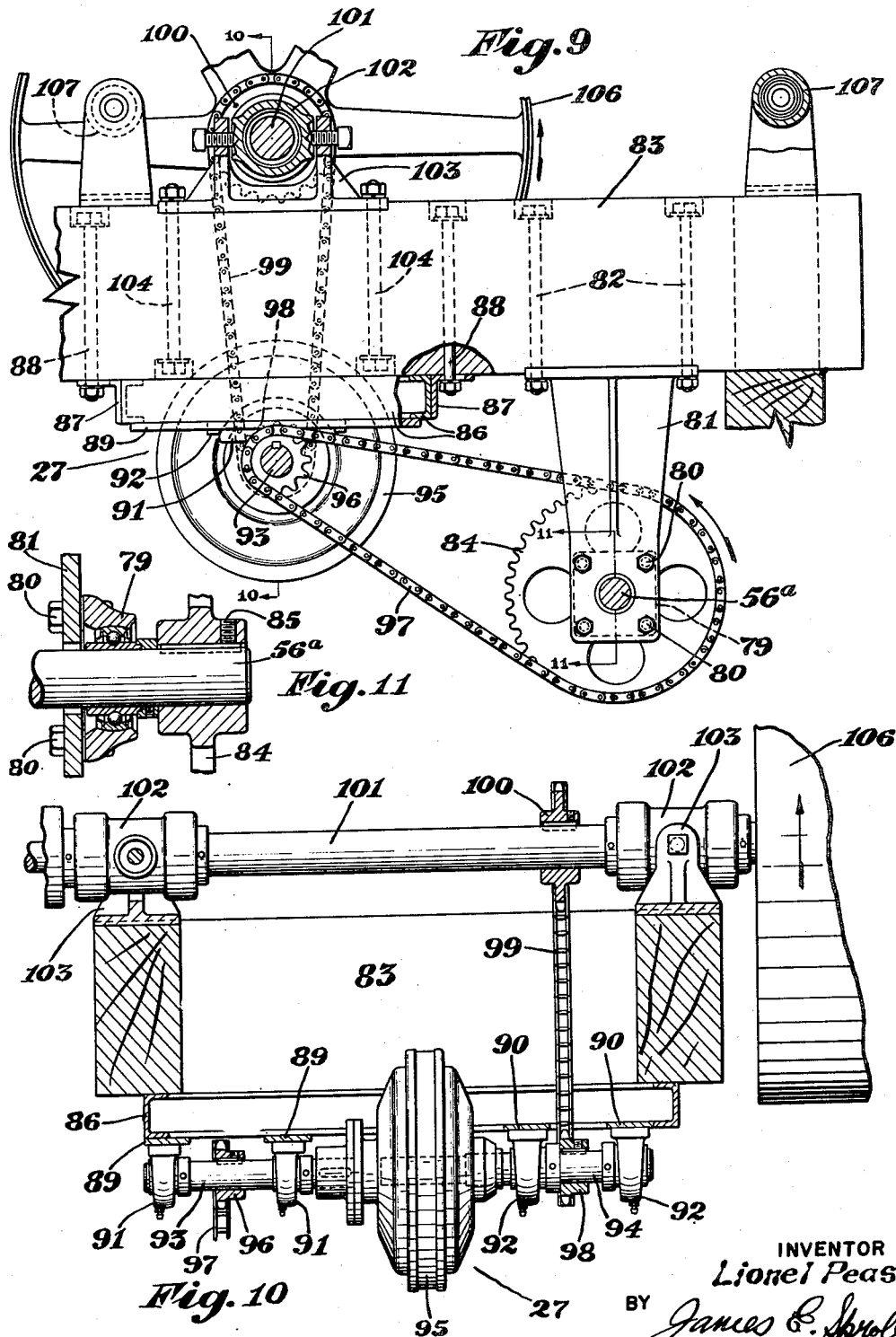

Patented July 10, 1951

2,560,126

UNITED STATES PATENT OFFICE 2,560,126

REVERSIBLE VARIABLE-SPEED AND VARIABLE-TORQUE TRANSMISSION MECHANISM

Lionel Pease, Seattle, Wash., assignor to Frank H. Draper, Seattle, Wash.

Application December 17, 1946, Serial No. 716,732

11 Claims. (Cl. 74—218)

This invention aims primarily to provide a reversible variable-speed and variable-torque transmission mechanism, or reversible and multi-speed drive mechanism, having a range of controlled speeds and degrees of torque output from zero to maximum and conversely, regardless of direction of rotation, whereby any speed and degree of torque within the scope of the mechanism may be rapidly and expeditiously delivered.

Another object of the invention is to provide a reversible variable-speed and variable-torque transmission mechanism, the power output shaft of which is rotatable in either direction and at any speed from zero to maximum and conversely and the degree of output torque of such shaft is progressively increased and/or decreased in conformity with and in proportion to the speed of same.

A further object is to provide a reversible variable-speed and variable-torque transmission mechanism, the reversely rotatable, variable-speed and variable-torque output shaft of which has a lower maximum speed and a higher maximum torque output in one direction and a higher maximum speed and a lower maximum torque output in the opposite direction.

A still further object is to provide a reversible variable-speed and variable-torque transmission mechanism, especially adaptable for use with classes of machinery, wherein it is desirable and essential to have and provide a relatively slow and progressively increasing motion and similarly increasing torque in one direction followed by a rapid return motion and decreased torque in the opposite direction, whereby idle or nonproductive periods of such machinery is materially curtailed or reduced.

A still further object is to provide a reversible variable-speed and variable-torque transmission mechanism embodying in a novel and improved combination pressure fluid operable means and variable pressure control means therefor, which combination functions to vary the speed and torque output delivered by the mechanism from zero to maximum and conversely.

A still further object is to provide a reversible variable-speed and variable-torque transmission mechanism embodying shock absorbing means capable of absorbing and withstanding all shocks incident to the operation thereof, particularly during reverse movements of the same.

A still further object is to provide a reversible variable-speed and variable-torque transmission mechanism, which is particularly adaptable and peculiarly suited for incorporation in and use with a sawmill installation, of either the permanent or portable type, whereby traversal or feeding and gig back movements of the sawmill carriage thereof is effected with a flexibility of control and a smoothness of operation hitherto unattainable with either steam operation or any of the varied types of carriage feed and gig back mechanisms formerly employed.

A still further object is to provide a reversible variable-speed and variable-torque transmission mechanism, which is readily adaptable for either pneumatic or hydraulic operation, and for either local or remote control, which latter feature is especially desirable in sawmill installations and operations, for the reason that the operator or sawyer may observe the work from a safe distance, thus minimizing accident hazards and reducing operational costs.

With the foregoing in view, the invention essentially resides, and is more particularly concerned in the provision of a reversible variable-speed and variable-torque transmission mechanism, which in the simplified embodiment and form now contemplated is characterized by the employment of power transmission means adapted for connection with a suitable source of power and including an hydraulic coupling and dual fluid-distensible torque transmitting and cushioning rotary clutch structures; a power output shaft drivably connected with said clutch structures for reverse rotation thereby at different maximum rates of speed; and means for conducting pressure fluid to said clutch structures including variable pressure control means adapted to selectively deliver pressure fluid to either of the clutch structures and to automatically maintain the specific delivered pressure and/or graduate the pressure on or off to obtain any pressure between zero and maximum, whereby progressive distention and/or similar deflation of the selected clutch structure is effected, to thus vary the speed and output torque of the power output shaft in either direction from zero to maximum and conversely, all of which are to be correlated in the broad aim of enhancing the efficiency of the present mechanism.

The above, and additional objects which will hereinafter be more specifically treated are attained by such means as are shown in the accompanying drawings, described in the following specification, and then more clearly pointed out in the claims, which are appended hereto and form part of this application.

With reference to the drawings, in which there is illustrated one embodiment of the invention, and throughout the several views of which like characters of reference designate similar parts:

Figure 1 is a plan view of a sawmill installation equipped with the reversible variable-speed and variable-torque transmission mechanism comprehended by the present invention;

Fig. 2 is a side elevation thereof;

Fig. 3 is an enlarged transverse vertical section of the same taken on the line 3—3 of Fig. 1;

Fig. 4 is an enlarged plan view of the reversible variable-speed and variable-torque transmission mechanism of the invention with certain parts broken away and certain other parts shown in section for clarity of illustration;

Fig. 5 is a fragmentary longitudinal vertical section thereof taken on the line 5—5 of Fig. 4;

Figs. 6, 7 and 8 (sheet 2) are enlarged transverse vertical sections of the same taken on the lines 6—6, 7—7 and 8—8, respectively of Fig. 4;

Fig. 9 is a fragmentary longitudinal vertical section of the mechanism taken on the line 9—9 of Fig. 4;

Figs. 10 and 11 are fragmentary transverse vertical sections of the same taken on the lines 10—10 and 11—11, respectively, of Fig. 9, and Fig. 12 (sheet 4) is a fragmentary inverted perspective view of the lower portion of the two-way variable pressure control valve of the mechanism, illustrating more specifically the piping connection thereof.

In the present disclosure, I have elected to show and describe the reversible variable-speed and variable-torque transmission mechanism of the invention, as operatively adapted and designed for use with and incorporation in a sawmill installation, to function therein as the sawmill carriage feed and power transmission mechanism; however, I desire to have it here understood that this is for illustrative purposes only, inasmuch as said mechanism has many adaptations and varied applications.

In the accompanying drawings, the numeral 20 designates longitudinally disposed and still supported spaced parallel track timbers and 21 a sawmill track carried thereby, upon which a sawmill carriage 22 is adapted to be traversed or advanced and retracted during sawing operations by an endless cable 23 fixedly secured at its terminals to opposite ends of the carriage 22, which cable passes over and is supported by idler sheaves 24 operatively mounted in longitudinally aligned relation, upon the outer end portions of sill supported rails 25 interposed in longitudinal spaced parallel relation between the ends of the track timbers 20. For effectuating reciprocative movements of the sawmill carriage 22 upon the track 21, the cable 23 is connected to the sawmill carriage feed mechanism in a manner presently to be described.

Coming now to the detailed description of the reversible variable-speed and variable-torque transmission mechanism of the present invention, which for a readier understanding of the mode of construction and operation of the same, particularly as it concerns its present adaptation and application, will hereinafter be referred to, but merely for descriptive purposes as previously indicated, as a sawmill carriage feed and power transmission mechanism, which as herein disclosed essentially consists of a variable-speed and variable-torque transmitting or sawmill carriage feed unit 26 and a complemental power or torque transmitting unit 27, which functions as the drive for the feed unit 26.

The sawmill carriage feed unit 26 together with its complemental drive unit 27 are located substantially midway the length of the track timbers 20, said feed unit 26 being mounted upon the underside of said timbers in transversely disposed relation thereto, while the drive unit 27 extends laterally from the inner track timber in alignment with the feed unit 26.

The numeral 28 designates a longitudinally disposed rectangular supporting frame for the feed unit 26, which frame is preferably, although not necessarily, fabricated from angle iron and is fixedly secured at its corners to the underside of the track timbers 20 by bolts 29 (Figure 5). Rigidly secured to and depending from the underside of the frame 28, at opposite sides thereof and adjacent one end of same, are axially aligned ball bearing pillow blocks 30 (Figures 4 and 6), wherein are journalled the terminal portions of a transversely disposed reversible drum shaft 31 having a carriage feed drum 32 keyed thereon, or otherwise fixedly secured thereto, substantially midway its length, the periphery of said drum being spirally grooved to receive the endless cable 23, which latter at all times has a series of wraps around said drum regardless of the direction of rotation of the same. Similarly secured to the shaft 31 in axially spaced relation to the ends of the drum 32 are sprocket wheels 33 and 34, respectively, the former being adapted to impart a relatively slower speed to the drum 32 in one direction, whereby the sawmill carriage 22 is advanced during sawing operations, while the latter is adapted to impart a relatively higher speed to the drum 32 in the opposite direction to effect return of the carriage 22 during aforesaid operations, as will hereinafter be made more apparent. The cable drum 32 is positively held against axial movement upon the shaft 31 by locking collars 32a, while the sprocket wheels 33 and 34 are similarly held by headless cap screws 33a and 34a, respectively.

Mounted in spaced parallel relation to the drum shaft 31 is a transversely disposed gig back or reversing shaft 35 journalled at its ends within axially aligned ball bearing pillow blocks 36 (Figures 4 and 7) rigidly secured to and depending from the underside of the frame 28, at opposite sides thereof, and substantially midway the length of same. Operatively mounted upon the inner portion of the gig back shaft 35 in abutting endwise relation and in the following order are: a spur gear 37 normally in abutment with the inner face of the adjacent pillow block 36 and keyed or otherwise fixedly secured to the shaft 35 and positively held against axial movement thereon by a headless set screw 38; a flanged spacer collar 39 held against axial and/or rotative movement on the shaft 35 by a headless set screw 40; a bossed and bushed sprocket pinion 41 and a bossed and bushed gig back clutch drum 42 rigidly interconnected by a plurality of socket head cap screws 43 and conjointly revoluble upon the shaft 35; and a fluid-distensible torque transmitting and cushioning rotary structure 44 of the expanding type adaptable for frictional engagement with the drum 42 and thereby jointly functioning as the gig back clutch of the mechanism 26, as will hereinafter be made more apparent.

The type of fluid-distensible torque transmitting and cushioning rotary structure 44 herein shown is well known in the industrial art, hence, no claim for novelty in such structure, per se, is made herein, the novelty and invention, in the present instance, residing in the combination of such structure, or its mechanical equivalent, with the other elements and features of the instant invention. The structure 44, of the gig back clutch, as herein disclosed, essentially consists of a centrally bossed disk-shaped adapter 45, which is rigidly secured, by keying or otherwise, to the shaft 35 for rotation therewith and is positively held against axial movement thereon by a headless cap screw 46. Rigidly secured by bolts 47 to the inner face and marginal portion of the adapter 45 is an inwardly extending annular flange 48, adapted to be normally disposed in a common plane with and in concentric spaced relation to the annulus of the clutch drum 42. Similarly secured, in any suitable manner, to the periphery of the annular flange 48 is a fluid-distensible tire-like rubber member 49, which latter upon its outer expandable wall is provided with a series of clutching or friction shoes adaptable for frictional engagement with the inner face of the annulus of the clutch drum 42. Fluid pressure is supplied to the distensible tire-like rubber member 49 by an L-shaped fitting 51 having communication with the outer end of a radially disposed passageway or duct 52 formed within the adapter 45, which passageway 51 at its inner end communicates with the angular inner terminal of an axial bore 53 formed within the inner end portion of the gig back shaft 35 and extending to the inner terminal face of same. Threadedly secured within the outer end of the bore 53 is a "Rotorseal" 54, which latter is also well known in the industrial art and is fabricated and furnished by the manufacturer of the fluid-distensible torque transmitting rotary structure 44. Briefly, the "Rotorseal" 54 consists of a ground and lapped spindle rotating in a sealed double row ball bearing and is positively sealed within its correlated casing by a non-metallic bushing. The "Rotorseal" 54 is connected to a suitable source of fluid pressure in a manner hereinafter more fully described.

The carriage feed drum shaft 31 is drivably connected with the clutch of the gig back shaft 35 by an endless sprocket chain 55 adapted to pass around and mesh with the sprocket wheel 34 and the sprocket pinion 41, whereby said drum shaft 31 and its correlated carriage feed drum 32, upon engagement of the gig back shaft clutch, is rotated at a relatively high speed, to effect rapid return movement of the sawmill carriage 22 following each sawing operation.

Mounted upon the supporting frame 28, adjacent the opposite end of same to that of the drum shaft 31, and arranged in spaced parallel relation to the gig back shaft 35, is a transversely disposed carriage feed or advancing shaft 56 having its axis located in a plane slightly below the plane of the axes of the drum shaft 31 and the gig back shaft 35 and having its ends journalled within axially aligned ball bearing pillow blocks 57 (Figures 4, 5 and 8) rigidly secured to and depending from spacer bars or members 28a similarly secured to the underside of the frame 28, at opposite sides of the same. Operatively mounted upon the outer portion of the feed shaft 56 in endwise abutting relation and in the following order are: a flanged spacer collar 58 normally in abutment with the inner face of the adjacent pillow block 57 and held against axial and/or rotative movement upon the feed shaft 56 by a headless set screw 59; a bossed and bushed sprocket pinion 60 and a bossed and bushed feed clutch drum 61 rigidly interconnected by a plurality of socket head cap screws 62 and conjointly revoluble upon the feed shaft 56; and a flanged retaining collar 63 adapted to be locked to the feed shaft 56 by a headless set screw 64, to thus positively prevent axial movement of the conjoined sprocket pinion 60 and feed clutch drum 61 upon said feed shaft 56.

Also operatively mounted upon the feed shaft 56 in axially spaced relation to the retaining collar 63 is a fluid-distensible torque transmitting and cushioning rotary structure 65 of the expanding and heavy duty type adapted to frictionally engage the drum 61 and hence conjointly therewith function as the feed clutch of the work feed mechanism 26, as will hereinafter be made more apparent and obvious. The fluid-distensible rotary structure 65 is also well known in the industrial art and hence a brief description of its present application will suffice.

The heavy duty type of torque transmitting rotary structure 65 essentially comprises a centrally bossed disk-shaped adapter 66 keyed or otherwise fixedly secured to the feed shaft 56 for rotation therewith and positively held against axial movement thereon by a headless cap screw 67. Rigidly secured to the inner face and marginal portion of the adapter 66, as by bolts 68, is an outwardly extending annular channel member 69, adapted to be normally disposed in a common plane with and in concentric spaced relation to the annulus of the feed clutch drum 61. Seated within and secured to the channel member 69 is a fluid-distensible tire-like rubber member 70 provided upon its outer expandable wall with a plurality of spring-pressed clutching or friction shoes 71 adaptable for frictional engagement with the inner face of the annulus of the drum 61. Fluid pressure is supplied to the distensible tire-like rubber member 70 through a fitting 72 and union-coupled tubing 73, which latter at its inner end communicates with the angular inner terminal of an axial bore 74 formed within the outer end portion of the feed shaft 56 and extending to the outer terminal face of same. Threadedly secured within the outer end of the bore 74 is a "Rotorseal" 75 of the type hereinbefore described for the "Rotorseal" 54. The "Rotorseal" 75 is connected to a suitable source of fluid pressure in a manner hereinafter more fully described.

The carriage feed drum shaft 31 is drivably connected with the clutch of the feed shaft 56 by an endless sprocket chain 76 adapted to pass around and mesh with the sprocket wheel 33 and the sprocket pinion 60, whereby the drum shaft 31 and its correlated carriage feed drum 32, upon engagement of the feed shaft clutch, is rotated at a relatively low speed during the advancing or feeding movements of the sawmill carriage 22.

Keyed, or otherwise rigidly secured to the inner end portion of the feed shaft 56 and abutting the inner face of the adjacent pillow block 57 is a spur gear 77 adapted to normally mesh with the gig back shaft spur gear 37 and thereby impart, at a speed ratio of 1:1, reverse rotative movement thereto, as indicated by the directional arrows in Fig. 4. The spur gear 77 is positively held against axial movement upon the feed shaft 56 by a headless set screw 78, as shown in Fig. 8.

For operatively interconnecting the sawmill carriage feed unit 26 with the power transmitting or drive unit 27, which will shortly be described, the transversely disposed carriage feed or advancing shaft 56 is provided at its inner end with an extension 56a (Figures 3 and 4), which latter is journalled adjacent its outer end in a ball bearing flange cartridge 79 rigidly secured by bolts 80 to the lower end of a depending webbed bracket or hanger 81 similarly secured at its upper flanged end by bolts 82 to the underside of a sill-supported and longitudinally disposed rectangular husk or saw frame 83 adjacent one corner thereof, as shown in Figs. 3, 4 and 9. Keyed or otherwise, fixedly secured to the outer terminal portion of the extension 56a and normally abutting the outer end of the flange cartridge 79 is a sprocket wheel 84, which is positively held against axial movement upon said terminal portion by a headless set screw 85 (Figure 11).

Reverting now to the power or torque transmitting unit 27 of the instant mechanism for a more detailed description of the same, the numeral 86 designates a transversely disposed rectangular support frame, which, in the present instance, is mounted for longitudinal adjustment upon the underside of the husk 83 substantially midway the length thereof. This frame is preferably, although not necessarily, fabricated from channel iron, and is provided upon its sides at the corners thereof with slotted angular lugs 87, which are welded or otherwise rigidly secured thereto. Bolts 88 conjointly with the slotted angular lugs 87 function to adjustably secure the support frame 86 in the selected location upon the underside of the husk 83. Welded or otherwise rigidly secured at their ends to the underside of the inner end portion of the support frame 86 in lateral spaced relation thereon are longitudinally disposed support bars 89, and similarly secured at their ends to the lower side flanges of the outer end portion of the support frame 86 are similarly spaced and disposed support bars 90, as will be manifest and apparent by referring to Figs. 9 and 10.

Rigidly secured to and depending from the underside of the support bars 89, substantially midway the length thereof, are axially aligned ball bearing pillow blocks 91, and similarly secured to and depending from the underside of the support bars 90 in axially aligned relation with the pillow blocks 91 are ball bearing pillow blocks 92. Journalled for rotation within the pillow blocks 91 is a driven or power output shaft 93 and similarly journalled within the pillow blocks 92 is a driving or power input shaft 94, said shafts at their adjacent or inner ends being interconnected by an hydraulic coupling 95, which in the present instance is illustrated as being of the well known "Twin Disk" type; however, it is to be here understood that other suitable types of hydraulic couplings may be employed with equal efficiency, the present showing being merely by way of illustration. As now contemplated, the driven shaft 93 is connected to a runner member of the hydraulic coupling 95, while, the driving shaft 94 is connected with an impeller member of said coupling.

Fixedly secured in any well known manner to the driven shaft 93 intermediate the pillow blocks 91 thereof is a sprocket pinion 96, which is connected by an endless sprocket chain 97 with the sprocket wheel 84, whereby said driven shaft 93 is drivably connected to the extension 56a of the feed shaft 56, substantially in the manner shown in Fig. 9.

Similarly secured to the driving shaft 94 intermediate the pillow blocks 92 thereof and normally abutting the outer end of the inner pillow block is a sprocket pinion 98 connected by an endless sprocket chain 99 with a sprocket wheel 100 rigidly secured to a saw arbor or main shaft 101, substantially midway the length thereof, to thus establish a drivable connection between said arbor 101 and the driving shaft 94, as will be apparent by referring to Figs. 9 and 10.

The saw arbor or main shaft 101 is normally disposed in vertically aligned spaced relation to the axially aligned driven and driving shafts 93 and 94, substantially in the manner shown in Fig. 9, and is journalled for rotation adjacent the ends thereof in ball bearing lineshaft boxes 102 mounted for sidewise adjustment in frames 103 fixedly secured by bolts 104 upon the upper face and at opposite sides of the husk or saw frame 83. Detachably secured in a conventional manner to the inner terminal portion of the saw arbor 101 is a circular saw 105, and rigidly secured to the outer or opposite terminal portion of said saw arbor is a driving pulley 106 adapted to be connected to and receive power from a prime mover, such as an electric motor, internal combustion engine, or the like, not shown.

For a readier understanding of the construction herein disclosed, the husk or saw frame 83 is also provided with the usual laterally disposed husk rollers 107, which are mounted in spaced parallel relation thereon, while, associated with the circular saw 105, are the customary adjustable saw guide 108 and splitter 109, the former being carried by the husk 83 and the latter upon the inner terminal of the shaft of the right hand or rearmost husk roller 107, see Figures 1 and 2.

To effect selective actuation of the fluid-distensible torque transmitting and cushioning rotary structures 44 and 65, respectively, and to progressively distend or deflate same to secure the desired variation in speed and degree of torque transmitted by the mechanism, a two-way or double-acting variable pressure valve 110 (Figures 1, 2 and 10) is provided, which is adapted to precisely and positively control the fluid pressure selectively delivered to said rotary structures 44 and 65, according to the position of the valve operating lever 111 and also by reason of the fact that the delivered fluid pressure is automatically maintained by the valve and may be graduated on or off to obtain any pressure between zero and maximum.

The variable-pressure or metering valve 110 is well known and widely employed in the industrial field, hence, a detailed exposition of the construction thereof is deemed unnecessary herein, except for the following brief description of the piping connections for same. A fluid pressure supply pipe 112 connects the inlet of the valve 110 with a suitable source of fluid pressure, not shown; a fluid pressure delivery pipe 113 connects one of the fluid pressure outlets of said valve with the "Rotorseal" 54 of the rotary structure 44, while, a similar delivery pipe 114 connects the other fluid pressure outlet of the valve with the "Rotorseal" 75 of the rotary structure 65, each of said fluid pressure delivery pipes 113 and 114 having a quick-opening automatic exhaust valve 115 interposed therein adjacent its correlated rotary structure 44 or 65, whereby deflation of such structure is rapidly effected following operative periods of the same; and finally 116 denotes a fluid pressure exhaust pipe connected to and extending from the exhaust outlet of the valve 110, wherethrough a fraction of the delivered fluid pressure is exhausted during normal automatic operation of the exhaust valves 115, and in the event either or both of said valves get out of order for any reason all of the operating fluid pressure from either or both rotary structures 44 and/or 65 is exhausted therethrough.

The operation of the herein described sawmill carriage feed and power transmission mechanism, for effecting traversal of the sawmill carriage 22, is as follows: rotation in a counterclockwise direction (as seen in Figure 2) is imparted by the driving pulley 106 to the circular saw 105 directly through the arbor 101, and in a similar direction to the feed drive shaft 56 through the power of torque transmitting unit 27, and thence in a clockwise direction to the gig back shaft 35 through the spur gears 77 and 37, all in an obvious manner, which shafts 56 and 35 rotate freely when their respective clutches are disengaged or inactive, as obtains when the operating lever 111 of the two-way variable-pressure valve 110 is in its neutral or mid-position shown in full lines in Figs. 1 and 2.

To advance the sawmill carriage 22 for a sawing operation, the operator or sawyer, depending upon the characteristics of the material being handled, may either progressively move the operating lever 111 from its neutral or mid-position to the dot and dash or right-hand position shown in Fig. 2, to thereby graduate or meter the fluid pressure delivered to the fluid-distensible member 70 of the rotary structure 65; or may directly move said lever to such position and thereby instantly deliver the full or maximum pressure to the member 70, in either event, admission of fluid pressure to the latter causes distension or expansion of the same, which results in frictional engagement of the friction shoes 71 with the annulus of the clutch drum 62, thus completing engagement of the feed clutch of the sawmill carriage feed unit 26 and thereby establishing a driving connection between the feed shaft 56 and the drum shaft 31 through the sprocket pinion 60, sprocket chain 79 and sprocket wheel 33. Establishment of the driving connection just described imparts to the drum shaft 31 and its correlated carriage feed drum 32 rotation in a counterclockwise direction, whereby the lower right-hand portion of the endless cable 23 is wound upon the drum 32, while the left-hand portion of same is concurrently unwound therefrom, thus causing advancement or feeding movement of the sawmill carriage 22 towards the circular saw 105 for cutting a plank or portion "A" from the log or block of timber "B" resting thereon, said portion "A" for clarity of illustration being indicated by dotted lines in Fig. 1.

To gig back or rapidly return the sawmill carriage 22 to its retracted position shown in Figs. 1 and 2, following the above described cutting or sawing operation, the sawyer or operator moves the operating lever 111 of the valve 110 from its dot and dash or right-hand position through its neutral or mid-position to the left-hand position shown in dotted lines in Fig. 2, at which time the fluid pressure in the fluid-distensible member 70 is exhausted therefrom, thus disengaging the clutch of the feed shaft 56 and disestablishing the driving connection between the latter and the drum shaft 31. Concurrently with the foregoing, fluid pressure is admitted to the fluid-distensible member 49 of the rotary structure 44 causing distention or expansion of the same and in consequence frictional engagement of the friction shoes 50 with the annulus of the gig back clutch drum 42, thereby completing engagement of gig back clutch and establishing a driving connection between the gig back shaft 35 and the drum shaft 31 through the sprocket pinion 41, sprocket chain 55 and sprocket wheel 34. By thus establishing the driving connection above mentioned, rotation in a clockwise direction is imparted to the drum shaft 31 and its correlated carriage feed drum 32, whereby the lower left-hand portion of the endless cable 23 is wound upon the drum 32, while the lower right-hand portion of the same is simultaneously unwound therefrom, to thus gig back or effect rapid return of the sawmill carriage 22 to its fully retracted position, at which time the log "B" is advanced, in a well known manner, to a new saw line for the next or succeeding sawing operation. Upon completion of the gig back or return movement of the sawmill carriage 22, the sawyer or operator moves or returns the operating lever 111 of the valve 110 to its neutral or mid-position, whereupon the fluid pressure in the fluid-distensible member 49 is exhausted therefrom, thus disengaging the gig back clutch of the gig back shaft 35 and thereby disestablishing the driving connection between the latter and the drum shaft 31, following which the hereinbefore described cycle of operation is successively repeated.

From the foregoing it should be apparent and manifest that variations in speed and torque transmitted by the reversible drum or power output shaft 31 of the present mechanism, from zero to maximum and conversely regardless of rotational direction, is obtained by metering, or progressively increasing or similarly decreasing the amount of pressure fluid delivered to the fluid-distensible torque transmitting and cushioning rotary clutch structures 44 and 65, respectively, through manipulation of the two-way variable pressure valve 110, inasmuch as such metering of pressure fluid results in varying degrees of frictional engagement of said clutch structures, or, in other words, results in varying degrees of slippage between the opposing frictional surfaces of same, depending upon the amount of pressure fluid delivered thereto.

In the herein disclosed mechanism, the hydraulic coupling 95 is shown and described as being incorporated in and with the power or torque transmitting unit 27, but, it should be here clearly understood that in many instances conditional upon the class of machinery with which the mechanism is to be used and for compactness and simplicity of construction, such coupling may be incorporated in and with the variable-speed and variable-torque transmitting unit 26, in which event the feed shaft 56 becomes the drive shaft of the mechanism and is accordingly connected to a suitable source of power; in either case, however, the hydraulic coupling 95 functions in its correlated mechanism to assure smooth operation by eliminating shock loads, torsional vibration and excessive strains of all kinds during operative periods of the same, and thus adds immeasurably to the service life of the mechanism. For a clearer and readier understanding of the manner in which the hydraulic coupling 95 functions in the present mechanism, it should be stated that the slipping action of said coupling absorbs all shock during operative periods of same, especially when reversing rotational direction of the power output shaft 31 of the mechanism; further, such slipping action of the coupling effectually prevents burning of the frictional shoes of both the rotary clutch structures 44 and 65, particularly, the shoes of the heavy duty feed clutch structure 65.

Exhaustive experimentation and tests together with actual use, particularly in sawmill installations of both the portable and permanent types, have shown and demonstrated that the most desirable and practical operational cable speeds for effecting sawmill carriage traversal to be as follows: zero to 300 feet per minute for the carriage feed and zero to 600 feet per minute for the carriage gig back. The above-mentioned experimentation, tests and use have also indicated, especially for sawmill operations, that hydraulically activated clutches, rather than pneumatically activated clutches, are preferable and more suitable for such operations, for the reason that they enable the operator or sawyer to better feel or sense the proper and most desirable speed at which to feed the log or timber to the saw.

Summarizing the foregoing, it should be here noted and observed that by combining the fluid-distensible torque transmitting and cushioning rotary clutch structures 44 and 65, respectively, and the hydraulic coupling 95 within the reversible variable-speed and variable-torque transmission mechanism as contemplated and comprehended by the present invention, a flexibility of control of the sawmill carriage, or its mechanical equivalent in a structure other than a sawmill, is at all times and under all conditions positively assured; also, a smoothness of operation is obtainable, which is infinitely smoother than steam operation or any of the various mechanical apparatuses or devices heretofore employed for like purposes.

In conclusion and in order to insure of a broad and proper interpretation of the appended claims, it should and must be borne in mind that alternative or equivalent terms may be and are used interchangeably therein for the several essential elements or members of the present mechanism, such as: drum shaft or power output shaft; gig back shaft or reversing shaft; feed shaft or drive shaft; gig back clutch or reverse clutch; and feed clutch or drive clutch, it being recalled in this connection, that it was previously stated in the foregoing description, that the sawmill nomenclature employed therein was for descriptive purposes only, hence no confinement or restriction of the present mechanism to a specific or limited use with sawmill mechinery is neither anticipated nor contemplated, inasmuch as, it is readily adaptable and applicable to many other classes of machinery, wherein reverse movements with varying speed and torque are desired and required.

Manifestly, therefore, the instant reversible variable-speed and variable-torque transmission mechanism is comparatively simple in construction and operation; is easy to install; is positive and efficient in use; provides a highly effective reversible and multi-speed drive capable of many uses; will not readily get out of order; and may be manufactured at a comparatively low cost.

While I have herein shown and described the invention with sufficient detail to enable those skilled in the art to understand the mode of construction and the principles involved, it is to be understood that there is no intentional limitation herein to the specific forms and precise details of construction of the invention shown and described, except as expressly defined by the appended claims, and it is to be further understood that various changes and modifications of such construction may be resorted to without departing from the spirit of the invention or the benefits derivable therefrom.

What I claim as my invention and desire to secure by Letters Patent is:

1. In a reversible variable-speed and variable-torque transmission mechanism, the combination of a longitudinally disposed supporting frame; a laterally disposed feed shaft journalled on said frame; power drive means operatively connected to said feed shaft, said drive means having an hydraulic coupling incorporated therein; a similarly disposed reversing shaft journalled on said supporting frame in spaced parallel relation to said feed shaft; intermeshing spur gears rigidly secured to said feed and reversing shafts for effecting opposite rotation thereof at the same speed; friction clutch drums revolubly mounted upon said feed and reversing shafts; fluid-distensible torque transmitting and cushioning rotary clutch structures rigidly secured to said shafts for rotation therewith and adapted upon distention to engage their associated friction clutch drums for establishing driving connections between the latter and the correlated shafts thereof; a laterally disposed reversible power output shaft journalled on said supporting frame in spaced parallel relation to said feed and reversing shafts; sprocket gearing of different speed ratios drivably connecting the clutch drums of said feed and reversing shafts with said power output shaft, whereby the maximum speed attained by the latter when rotated in one direction by the feed shaft is substantially lower than when rotated by the reversing shaft in the opposite direction; means for conducting pressure fluid to said clutch structures to distend same; and a two-way variable pressure valve interposed in said conducting means adapted to selectively deliver pressure fluid to the clutch structures and to graduate such delivery thereto from zero to maximum and conversely, whereby the degree of frictional engagement of the selected clutch structure with its related clutch drum is progressively increased or decreased to vary the speed and torque transmitted by the feed and reversing shafts to the power output shaft from zero to maximum and conversely.

2. In a reversible variable-speed and variable-torque transmission mechanism, the combination of a supporting frame; a feed shaft and a reversing shaft journalled in spaced parallel relation on said supporting frame; gearing interconnecting said shafts for effecting opposite rotation thereof at the same speed; power drive means operatively connected with said feed shaft, said drive means including an hydraulic coupling and speed reduction gearing; friction clutch drums revolubly mounted upon said feed and reversing shafts; fluid-distensible torque transmitting and cushioning rotary clutch structures rigidly secured to said shafts for rotation therewith and adapted upon distention to engage their associated friction clutch drums for establishing driving connections between the latter and the correlated shafts of same; a reversible power output shaft journalled on said supporting frame in parallel spaced relation to the feed and reversing shafts; gearing of different speed ratios drivably connecting the clutch drums of the feed and reversing shafts with the power output shaft, whereby the maximum speed attained by the latter when driven by the feed shaft in one direction is substantially lower than when driven by the reversing shaft in the opposite direction; means for conducting pressure fluid to said clutch structures to distend same; and variable pressure control means interposed in said conducting means adapted to selectively deliver pressure fluid to the clutch structures and to graduate such delivery thereto from zero to maximum and conversely, whereby the degree of frictional engagement of the selected clutch structure with its related clutch drum is progressively increased or decreased to vary the speed and torque transmitted by the feed and reversing shafts to the power output shaft from zero to maximum and conversely.

3. In a reversible variable-speed and variable-torque transmission mechanism, the combination of a pair of freely rotating torque transmitting shafts adapted to be oppositely rotated at the same speed; power driven means including an hydraulic coupling adapted for operative connection with one of said shafts; friction clutch drums revolubly mounted upon said torque transmitting shafts; fluid-distensible torque transmitting and cushioning rotary clutch structures rigidly secured to such shafts for rotation therewith and adapted upon distention to engage their associated friction clutch drums for establishing driving connection between the latter and their correlated shafts; a reversible power output shaft; gearing of different speed ratios drivably connecting the last mentioned shaft with each of the clutch drums of said torque transmitting shafts, to provide for said power output shaft a higher speed range in one direction and a lower speed range in the opposite direction; means for conducting pressure fluid to said clutch structures to effect distention of the same; and variable pressure control means interposed in said conducting means adapted to selectively deliver pressure fluid to the clutch structures and to graduate such delivery thereto from zero to maximum and conversely, whereby the degree of frictional engagement of the selected clutch structure with its related clutch drum is progressively increased or decreased to vary the speed and torque transmitted by the torque transmitting shafts to the power output shaft from zero to maximum and conversely.

4. In a reversible variable-speed and variable torque transmission mechanism, the combination of oppositely rotating shafts; power driven means including shock absorbing means and adapted for drivable connection with one of said shafts; members having engagement surfaces and being adaptable for revoluble mounting upon such shafts; fluid-distensible torque transmitting and cushioning rotary clutch structures rigidly secured to said shafts for rotation in relation to said members and adapted upon distention to engage the aforementioned surfaces thereof; a reversible power output shaft; means drivably connecting the latter with each of said clutch structures for effecting reverse rotation of the same and to provide a substantially higher maximum speed in one direction than in the other; means for conducting pressure fluid to said clutch structures to distend the same; and variable pressure control means for said conducting means adapted to selectively deliver pressure fluid to the clutch structures and to graduate such delivery thereto from zero to maximum and conversely, whereby the degree of engagement of the selected clutch structure with its correlated member is progressively increased and/or decreased to vary the speed and torque transmitted by the oppositely-rotating shafts to the power output shaft from zero to maximum and conversely.

5. In a reversible variable-speed and variable-torque transmission mechanism, the combination of oppositely rotating shafts; power driven means including an hydraulic coupling drivably connected to one of said shafts; fluid-distensible torque transmitting and cushioning rotary clutch structures operatively mounted upon said oppositely rotating shafts; a reversible power output shaft; means connecting said clutch structures with said power output shaft for effecting reverse rotation of the latter and for providing a higher maximum speed therefor in one direction than in the other; means for conducting pressure fluid to said clutch structures to effect distention of same; and variable pressure control means for said conducting means adapted to selectively deliver pressure fluid to the clutch structures and to graduate such delivery thereto from zero to maximum and conversely, whereby the degree of frictional engagement of the selected clutch structure is progressively increased or decreased to vary the speed and torque transmitted by the oppositely rotating shafts to the power output shaft from zero to maximum and conversely.

6. In a reversible variable-speed and variable-torque transmission mechanism, the combination of oppositely rotating shafts; means for imparting relatively uniform rotation to one of said shafts; fluid-distensible torque transmitting rotary clutch structures operatively mounted upon said oppositely rotating shafts; a reversible power output shaft; means individually and drivably connecting the latter with each of said clutch structures, whereby reverse rotation of the same for different maximum speeds and for variable speeds from zero to said maximum speeds and conversely is effected upon progressive distention and/or similar deflation of the selected clutch structure; means for conducting pressure fluid to said clutch structures to distend same; and variable pressure control means interposed in said conducting means adapted to selectively and progressively deliver pressure fluid to and similarly exhaust the same from clutch structures to thereby vary the speed and torque output of said power output shaft from zero to the maximum in each direction.

7. In a reversible variable-speed and variable-torque transmission mechanism, the combination of oppositely rotatable shafts; fluid-distensible torque transmitting clutch structures carried by said shafts; a power output shaft drivably connected with said clutch structures for reverse rotation thereby at different maximum rates of speed; and means for conducting pressure fluid to said clutch structures including variable pressure control means adapted to selectively deliver pressure fluid to said clutch structures and to graduate such delivery thereto on or off for progressively distending and/or similarly deflating the selected clutch structure, to thereby vary the speed and torque output of said power output shaft from zero to the maximum in each direction.

8. In a reversible variable-speed and variable-torque transmission mechanism, the combination of a power output shaft; driving means adapted for effecting reverse rotation of said output shaft at different maximum rates of speed, said driving means including dual fluid-distensible torque transmitting and cushioning rotary clutch structures; and means for conducting pressure fluid to said clutch structures and having variable pressure control means adapted to selectively deliver to either of said clutch structures pressure fluid at any pressure from zero to maximum pressure and conversely, to thereby effect progressive distention and/or similar deflation of the selected clutch structure, and thus vary the speed and torque output of the power output shaft from zero to the maximum in each direction.

9. In a reversible variable-speed and variable-torque transmission mechanism, the combination of driving means including fluid-distensible torque transmitting clutch structures; a power output shaft operatively connected to said clutch structures for reverse rotation thereby; and means for conducting pressure fluid to said clutch structures including variable pressure control means, adapted to selectively deliver pressure fluid to either of the clutch structures and to automatically maintain the delivered pressure and/or graduate the latter on or off to obtain any pressure between zero and maximum, whereby progressive distention and/or similar deflation of the selected clutch structure is effected, to thus vary the speed and torque output of the power output shaft from zero to maximum in each direction.

10. The combination, in a reversible variable-speed and variable-torque transmission mechanism, of a power transmitting unit including a train of sprocket gearing having an hydraulic coupling located intermediately in said train, and a variable-speed and variable-torque transmitting unit comprising oppositely rotatable shafts, one of which is adapted to be drivably connected with the power output gear of said sprocket gearing; fluid-distensible torque transmitting clutch structures operatively mounted upon said oppositely rotating shafts; a power output shaft drivably connected with said clutch structures for reverse rotation thereby at different maximum rates of speed; means for conducting pressure fluid to said clutch structures; and variable pressure control means interposed in said conducting means adapted to selectively deliver pressure fluid to said clutch structures and for graduating the delivery of such pressure fluid on or off to obtain any pressure between zero and maximum, whereby progressive distention and/or similar deflation of the selected clutch structure is effected to thus vary the speed and torque output of the power output shaft from zero to maximum in each direction.

11. The combination, in a reversible variable-speed and variable-torque transmission mechanism, of a power transmitting unit including a gear train having an hydraulic coupling associated therewith; and a variable-speed and variable-torque transmitting unit comprising driving means operatively connected to the power output end of said gear train, said driving means including a plurality of fluid-distensible torque transmitting clutch structures; a power output shaft drivably connected to said clutch structures for rotation thereby at different maximum rates of speed in opposite directions; means for conducting pressure fluid to said clutch structures; and variable pressure control means interposed in said conducting means adapted to selectively deliver pressure fluid to said clutch structures and to graduate the delivery of pressure fluid on or off to obtain any pressure between zero and maximum, whereby progressive distention and/or similar deflation of the selected clutch structure is effected and variation in speed and torque output of the power output shaft from zero to maximum in opposite directions is obtained.

LIONEL PEASE.

REFERENCES CITED

The following references are of record in the file of this patent:

UNITED STATES PATENTS

| Number | Name | Date |
|---|---|---|
| 294,442 | Clark | Mar. 4, 1884 |
| 616,163 | Thompson | Dec. 20, 1898 |
| 2,309,285 | Walton | Jan. 26, 1943 |
| 2,396,549 | Amonsen | Mar. 12, 1946 |

OTHER REFERENCES

"Fluid Couplings," published by Hydraulic Coupling & Engineering Co., Ltd., Isleworth, England, pages 4 and 24.